(12) United States Patent
Gu et al.

(10) Patent No.: US 10,554,967 B2
(45) Date of Patent: Feb. 4, 2020

(54) ILLUMINATION COMPENSATION (IC) REFINEMENT BASED ON POSITIONAL PAIRINGS AMONG PIXELS

(71) Applicants:Futurewei Technologies, Inc., Plano, TX (US); Santa Clara University, Santa Clara, CA (US)

(72) Inventors: Zhouye Gu, San Diego, CA (US); Jianhua Zheng, Beijing (CN); Nam Ling, San Jose, CA (US); Chen-Xiong Zhang, Plano, TX (US)

( * ) Notice: Subject to any disclaimer, the term of this patent is extended or adjusted under 35 U.S.C. 154(b) by 601 days.

(21) Appl. No.: 14/664,348

(22) Filed: Mar. 20, 2015

(65) Prior Publication Data

US 2015/0271488 A1 Sep. 24, 2015

Related U.S. Application Data

(60) Provisional application No. 61/968,980, filed on Mar. 21, 2014.

(51) Int. Cl.
*H04N 19/105* (2014.01)
*H04N 19/39* (2014.01)
(Continued)

(52) U.S. Cl.
CPC ......... *H04N 19/105* (2014.11); *H04N 19/112* (2014.11); *H04N 19/119* (2014.11);
(Continued)

(58) Field of Classification Search
CPC .. H04N 19/105; H04N 19/112; H04N 19/119; H04N 19/139; H04N 19/182;
(Continued)

(56) References Cited

U.S. PATENT DOCUMENTS 8,774,282 B2 * 7/2014 Song .................... H04N 19/176
375/240.12
2002/0131500 A1 * 9/2002 Gandhi ................ H04N 19/533
375/240.16

(Continued)

FOREIGN PATENT DOCUMENTS

CN 1662067 A 8/2005
CN 101193302 A 6/2008
(Continued)

OTHER PUBLICATIONS

"Series H: Audiovisual and Multimedia Systems, Infrastructure of audiovisual services—Coding of moving video, Advanced video coding for generic audiovisual services," ITU-T, H.264, Feb. 2014, 790 pages.

(Continued)

*Primary Examiner* — Sath V Perungavoor
*Assistant Examiner* — Yong Joon Kwon
(74) *Attorney, Agent, or Firm* — Conley Rose, P.C.

(57) ABSTRACT

An apparatus comprises a receiver configured to receive video views comprising a reference view and a current view, wherein the reference view comprises a reference block and the current view comprises a current block, and a processor coupled to the receiver and configured to determine neighboring reference pixels associated with the reference block, determine neighboring current pixels associated with the current block, determine a first positional pairing between the neighboring reference pixels and the neighboring current pixels, determine a second positional pairing between the neighboring reference pixels and the neighboring current pixels, and determine an optimal pairing from between the first positional pairing and the second positional pairing.

39 Claims, 9 Drawing Sheets

(51) Int. Cl.
  *H04N 19/186* (2014.01)
  *H04N 19/112* (2014.01)
  *H04N 19/119* (2014.01)
  *H04N 19/139* (2014.01)
  *H04N 19/182* (2014.01)
  *H04N 19/593* (2014.01)
  *H04N 19/65* (2014.01)

(52) U.S. Cl.
  CPC ......... *H04N 19/139* (2014.11); *H04N 19/182* (2014.11); *H04N 19/186* (2014.11); *H04N 19/593* (2014.11); *H04N 19/65* (2014.11)

(58) Field of Classification Search
  CPC .... H04N 19/186; H04N 19/50; H04N 19/593; H04N 19/597; H04N 19/65; H04N 19/85
  USPC .................................................. 375/240.16
  See application file for complete search history.

(56) References Cited

U.S. PATENT DOCUMENTS

| | | | |
|---|---|---|---|
| 2005/0141615 A1* | 6/2005 | Kim | H04N 5/145 375/240.16 |
| 2005/0190844 A1* | 9/2005 | Kadono | H04N 21/41422 375/240.16 |
| 2005/0249284 A1* | 11/2005 | Lee | H04N 19/56 375/240.16 |
| 2007/0177672 A1 | 8/2007 | Yang | |
| 2007/0177674 A1 | 8/2007 | Yang | |
| 2008/0130750 A1* | 6/2008 | Song | H04N 19/176 375/240.16 |
| 2009/0034859 A1* | 2/2009 | Park | H04N 9/646 382/250 |
| 2009/0257669 A1 | 10/2009 | Kim et al. | |
| 2009/0304234 A1* | 12/2009 | Kondo | G06T 7/248 382/103 |
| 2009/0316043 A1 | 12/2009 | Liang et al. | |
| 2010/0086051 A1* | 4/2010 | Park | H04N 19/176 375/240.16 |
| 2010/0091845 A1* | 4/2010 | Jeon | H04N 19/597 375/240.12 |
| 2010/0232507 A1* | 9/2010 | Cho | H04N 19/597 375/240.16 |
| 2010/0266048 A1 | 10/2010 | Yang et al. | |
| 2011/0007800 A1 | 1/2011 | Zheng et al. | |
| 2012/0002082 A1* | 1/2012 | Johnson | G06T 5/50 348/234 |
| 2012/0293619 A1 | 11/2012 | Newton et al. | |
| 2013/0039416 A1* | 2/2013 | Someya | H04N 19/597 375/240.12 |
| 2015/0271524 A1* | 9/2015 | Zhang | H04N 19/597 375/240.16 |
| 2015/0350642 A1* | 12/2015 | Park | H04N 19/105 375/240.12 |
| 2016/0150238 A1* | 5/2016 | Park | H04N 19/103 375/240.08 |
| 2016/0337651 A1* | 11/2016 | Alshina | H04N 19/70 |

FOREIGN PATENT DOCUMENTS

| | | |
|---|---|---|
| CN | 101478672 A | 7/2009 |
| CN | 101529920 A | 9/2009 |
| CN | 101911708 A | 12/2010 |
| CN | 102640506 A | 8/2012 |
| WO | 2013028116 A1 | 2/2013 |

OTHER PUBLICATIONS

"Series H: Audiovisual and Multimedia Systems Coding of moving video, Implementors Guide for H.263: Video coding for bit rate communication" ITU-T, H.263, Implementors' Guide, Aug. 5, 2005, 10 pages.

Foreign Communication From A Counterpart Application, PCT Application No. PCT/CN2015/074817, International Search Report dated Apr. 29, 2015, 9 pages.

Foreign Communication From A Counterpart Application, PCT Application No. PCT/CN2015/074817, Written Opinion dated Apr. 29, 2015, 5 pages.

Tech, G., et al., "3D-HEVC Draft Text 3", Joint Collaborative Team on 3D Video Coding Extension Development of ITU-T SG 16 WP 3 and ISO/IEC JTC 1/SC 29/WG 11, Document: JCT3V-G1001-v2, 7th Meeting: San Jose, USA, Jan. 9-17, 2014, 102 pages.

Muller, K., et al., "Common Test Conditions of 3DV Core Experiments", Joint Collaborative Team on 3D Video Coding Extension Development of ITU-T SG 16 WP 3 and ISO/IEC JTC 1/SC 29/WG 11, Document: JCT3V-G1100, 7th Meeting: San Jose, US, Jan. 11-17, 2014, 8 pages.

Bross, B., et al., High Efficiency Video Coding (HEVC) text specification draft 10 (for FIDS & Last Call), Joint Collaborative Team on 3D Video Coding Extension Development of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.

Gu, Z., et al., "Improvement on illumination compensation reference pixels selection", Joint Collaborative Team on 3D Video Coding Extension Development of ITU-T SG 16 WP 3 and ISO/IEC JTC 1/SC 29/WG 11, Document: JCT3V-H0128, 8th Meeting: Valencia Spain, Mar. 29-Apr. 4, 2014, 6 pages.

Zhang, L., et al., "Test Model 7 of 3D-HEVC and MV-HEVC", Joint Collaborative Team on 3D Video Coding Extension Development of ITU-T SG 16 WP 3 and ISO/IEC JTC 1/SC 29/WG 11, Document: JCT3V-G1005, 7th Meeting: San Jose, US, Jan. 11-17, 2014, 56 pages.

Sullivan, G., et al., "Overview of the High Efficiency Video Coding (HEVC) Standard", IEEE Transaction on Circuits and Systems for Video Technology, vol. 22, No. 12, Dec. 2012, pp. 1649-1668.

Foreign Communication From A Counterpart Application, Chinese Application No. 201580014618.6, Chinese Office Action dated May 23, 2019, 6 pages.

Foreign Communication From A Counterpart Application, Chinese Application No. 201580014618.6, Chinese Search Report dated May 15, 2019, 2 pages.

Foreign Communication From A Counterpart Application, Chinese Application No. 201580014618.6, Chinese Search Report dated Nov. 27, 2018, 2 pages.

Foreign Communication From A Counterpart Application, Chinese Application No. 201580014618.6, Chinese Office Action dated Dec. 5, 2018, 28 pages.

\* cited by examiner

| | Coding Performance | | | Video PSNR / Video Bitrate | Video PSNR / Total Bitrate | Synth PSNR / Total Bitrate | Encoding Time | Decoding Time | Rendering Time |
|---|---|---|---|---|---|---|---|---|---|
| | Independent View | Dependent View 1 | Dependent View 2 | | | | | | |
| Balloons | 0.00% | 0.01% | -0.03% | 0.00% | -0.01% | -0.05% | 101.2% | 104.2% | 113.8% |
| Kendo | 0.00% | -0.05% | -0.02% | 0.01% | 0.00% | -0.01% | 101.6% | 104.1% | 106.9% |
| Newspaper_CO | 0.00% | -0.03% | -0.15% | -0.01% | 0.00% | -0.10% | 102.7% | 123.0% | 109.4% |
| GT_Fly | 0.00% | 0.00% | 0.02% | 0.00% | 0.00% | 0.01% | 102.0% | 114.3% | 101.8% |
| Poznan_Hall2 | 0.00% | -0.03% | -0.66% | -0.11% | -0.10% | -0.24% | 101.6% | 113.8% | 113.7% |
| Poznan_Street | 0.00% | -0.18% | -0.01% | -0.02% | -0.02% | -0.05% | 102.4% | 98.8% | 98.5% |
| Undo_Dancer | 0.00% | -0.03% | 0.00% | -0.01% | 0.00% | 0.04% | 101.6% | 111.9% | 105.6% |
| Shark | 0.00% | 0.00% | 0.00% | 0.00% | 0.00% | 0.00% | 101.9% | 99.2% | 98.7% |
| 1024x768 | 0.00% | -0.03% | -0.07% | 0.00% | 0.00% | -0.05% | 101.9% | 110.4% | 110.0% |
| 1920x1088 | 0.00% | -0.05% | -0.13% | -0.03% | -0.02% | -0.05% | 101.9% | 107.6% | 103.7% |
| average | 0.00% | -0.04% | -0.10% | -0.02% | -0.02% | -0.05% | 101.9% | 108.7% | 106.1% |

*FIG. 7*

ILLUMINATION COMPENSATION (IC) REFINEMENT BASED ON POSITIONAL PAIRINGS AMONG PIXELS

CROSS-REFERENCE TO RELATED APPLICATIONS

This application claims priority to U.S. provisional patent application No. 61/968,980 filed Mar. 21, 2014 by Zhouye Gu, et al., and titled "Reference Pixels Selection for Illumination Compensation," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traditional three-dimensional (3D) video is viewed in movie theaters using projectors and screens and at home using video players and televisions. Typically, the 3D video is stored on a medium such as a disc or a hard drive. The videos themselves are usually major motion pictures. However, 3D video is now expanding beyond movie theaters, home televisions, and major motion pictures.

For example, users will increasingly demand 3D video for sporting events and other types of entertainment. In addition, users will increasingly demand that 3D video be available on their Internet-enabled devices such as mobile phones and tablets. Instead of downloading 3D videos on those devices and watching the 3D videos later, users will want to stream and watch the 3D videos soon after they discover them. Streaming 3D videos via the Internet will be difficult because 3D videos require considerable bandwidth, which may lead to buffering and other issues given current bit rates.

One way to reduce that bandwidth requirement is to more efficiently encode the 3D videos at a transmitter and more efficiently decode the 3D videos at a receiver. Encoding comprises compression, and decoding comprises decompression. Prior encoding and decoding techniques, including H.264/Moving Picture Experts Group (MPEG)-4, which is incorporated by reference, do not provide for efficient 3D video encoding and decoding. There is therefore a need for more efficient 3D video encoding and decoding.

SUMMARY

In one embodiment, the disclosure includes an apparatus comprising a receiver configured to receive video views comprising a reference view and a current view, wherein the reference view comprises a reference block and the current view comprises a current block, and a processor coupled to the receiver and configured to determine neighboring reference pixels associated with the reference block, determine neighboring current pixels associated with the current block, determine a first positional pairing between the neighboring reference pixels and the neighboring current pixels, determine a second positional pairing between the neighboring reference pixels and the neighboring current pixels, and determine an optimal pairing from between the first positional pairing and the second positional pairing.

In another embodiment, the disclosure includes a method comprising receiving a reference view and a current view, wherein the reference view comprises a reference block and the current view comprises a current block, determining neighboring reference pixels associated with the reference block, determining neighboring current pixels associated with the current block, determining a first positional pairing between the neighboring reference pixels and the neighboring current pixels, determining a second positional pairing between the neighboring reference pixels and the neighboring current pixels, and determining an optimal pairing from between the first positional pairing and the second positional pairing.

In yet another embodiment, the disclosure includes an apparatus comprising a receiver configured to receive an encoded bitstream comprising a reference view comprising a first reference block, wherein the first reference block comprises first reference pixels with first reference pixel values, a current view comprising a first current block, wherein the first current block comprises first current pixels, and an indicator of a pairing, and a processor coupled to the receiver and configured to calculate first current pixel values for the first current pixels based on the first reference pixel values and the indicator.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is a graph of modeled performance for the IC refinement scheme in FIG. 5.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

High Efficiency Video Coding (HEVC), which is sometimes referred to as H.265, is a video encoding and decoding standard developed by International Organization for Standardization (ISO)/International Electrotechnical Commission (IEC) Moving Picture Experts Group (MPEG) and International Telecommunication Union Telecommunication Standardization Sector (ITU-T) Video Coding Experts Group (VCEG) and described in Benjamin Bross, et al., "High Efficiency Video Coding (HEVC) text specification draft 10 (for FDIS & Last Call)," Jan. 14, 2013, which is incorporated by reference. HEVC can either halve the bit rate of H.264/MPEG-4 while providing the same video quality or substantially improve the video quality of H.264/MPEG-4 at the same bit rate. HEVC supports 8K ultra-high-definition (UHD) television and resolutions up to 8192× 4320. While HEVC provides a significant improvement from prior video encoding and decoding techniques, HEVC does not sufficiently address 3D video.

Figure 1:
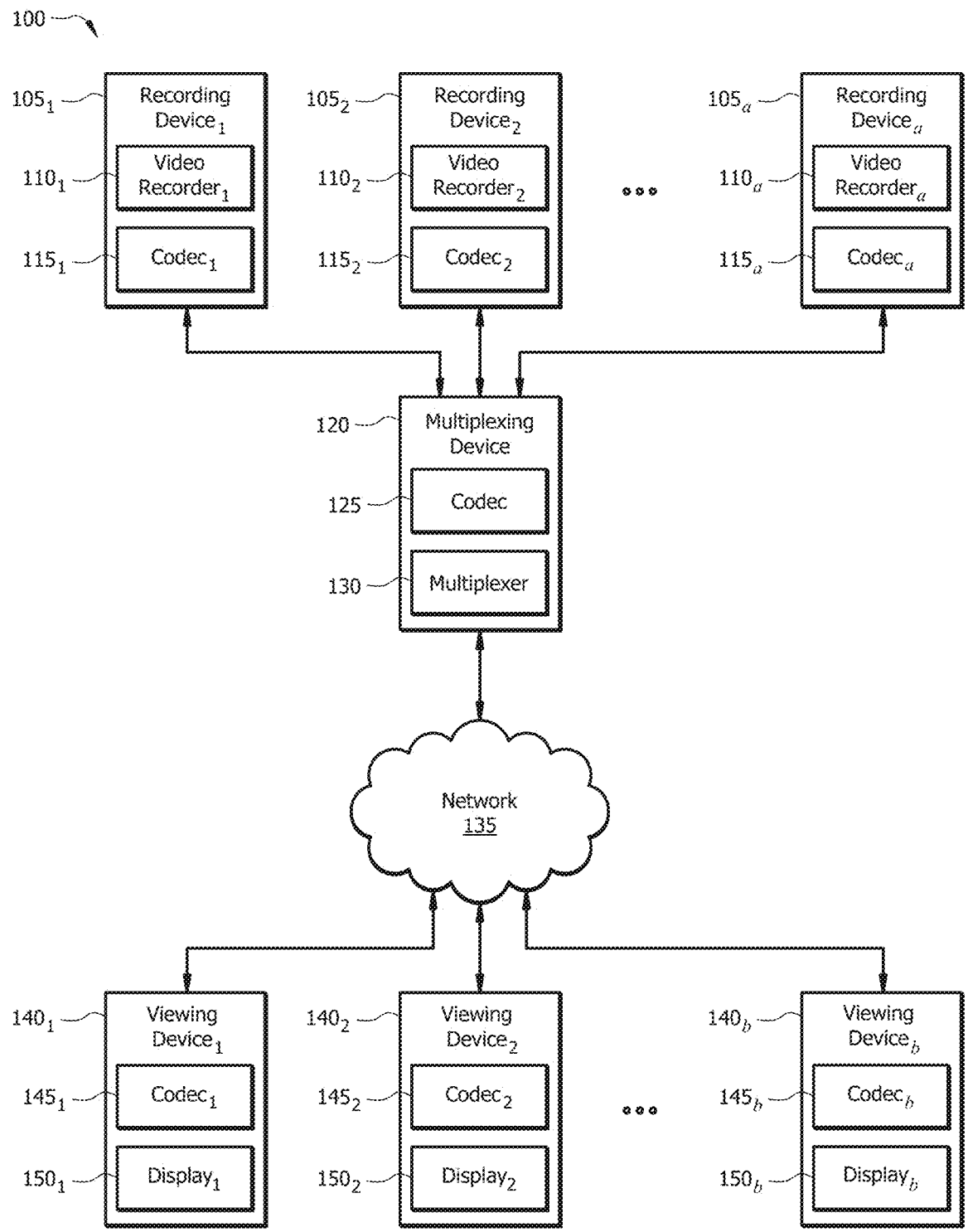
FIG. 1 is a schematic diagram of a 3D video system.

FIG. 1 is a schematic diagram of a 3D video system 100. The system comprises a recording devices 105, a multiplexing device 120 communicatively coupled to the recording devices 105, a network 135, and b viewing devices 140 communicatively coupled to the multiplexing device via the network 135. A and b are any positive integers. The components of the system 100 may be arranged as shown or in any other suitable manner.

The recording devices 105 each comprise a video recorder 110 and a codec 115. The video recorders 110 are any combination of hardware (e.g., a lens) and software suitable for recording videos. The codecs 115 are any software suitable for encoding the videos. However, the multiplexing device 120 typically performs the encoding as described below.

The multiplexing device 120 comprises a codec 125 and a multiplexer 130. The codec 125 is similar to the codecs 115 and is any software suitable for encoding the videos. The multiplexer 130 is any combination of hardware and software suitable for multiplexing the encoded videos to create a multiplexed video or bitstream.

The network 135 is any network suitable for providing communication among the components of the system 100. For instance, the network 135 is the Internet, a mobile telephone network, a local area network (LAN), a wide area network (WAN), or another suitable network. The network 135 provides communication along any suitable wired or wireless channels.

The viewing devices 140 may be, for instance, mobile phones or televisions associated with end users. The viewing devices 140 each comprise a codec 145 and a display 150. The codecs 145 are any software suitable for decoding the multiplexed video to create a decoded video. The displays 150 are any display suitable for displaying the decoded video for an end user to view.

In operation, the recording devices 105 each record, via the video recorders 110, separate videos of the same object or objects. For instance, the recording devices 105 each record video of a football game. However, the recording devices 105 are located at different locations throughout a football stadium, so the videos focus on the same football game, but do so from different angles. As the recording devices 105 record their respective videos, they communicate those videos to the multiplexing device 120. The recording devices 105 communicate the videos one view at a time or any suitable number of views at a time. Views may also be referred to as frames or images.

The multiplexing device 120 receives the views and encodes the views via the codec 125 to create encoded views. Then the multiplexing device 120 multiplexes the encoded views via the multiplexer 130 to create a multiplexed video. Next, the multiplexing device 120 communicates the multiplexed video to the viewing devices 140 via the network 135. The multiplexing device 120 may communicate the video in a bitstream format.

The viewing devices 140 receive the multiplexed video from the multiplexing device 120 via the network 135. The codecs 145 decode the multiplexed video to obtain the original multiplexed video. Finally, the displays 150 display the multiplexed video in a viewable format. Because the multiplexed video comprises videos from different angles, it creates the impression of 3D video to a viewer.

Alternatively, there may be a single recording device 105, for instance the recording device $105_1$. The recording device 105 comprises multiple video recorders 110 that record views from different angles, encodes the views via the codec 115 to create encoded views, and multiplexes the encoded views to create a multiplexed video. Finally, the recording device 105 communicates the multiplexed video to the viewing devices 140 via the network 135.

Traditional video recording such as that addressed in HEVC captures one video using one recording device at one angle. As can be seen in the system 100, there may be any number of recording devices 105 and corresponding videos to create 3D video. Each additional video requires additional data to encode, communicate, and decode. Encoding every bit of data for every video requires a significant amount of data, which may make streaming that video difficult or impossible given current data rates. Consequently, various techniques attempt to reduce that amount of data. Li Zhang, et al., "Test Model 7 of 3D-HEVC and MV-HEVC," Jan. 11, 2014 ("Zhang"), which is incorporated by reference, addresses 3D video.

Figure 2:
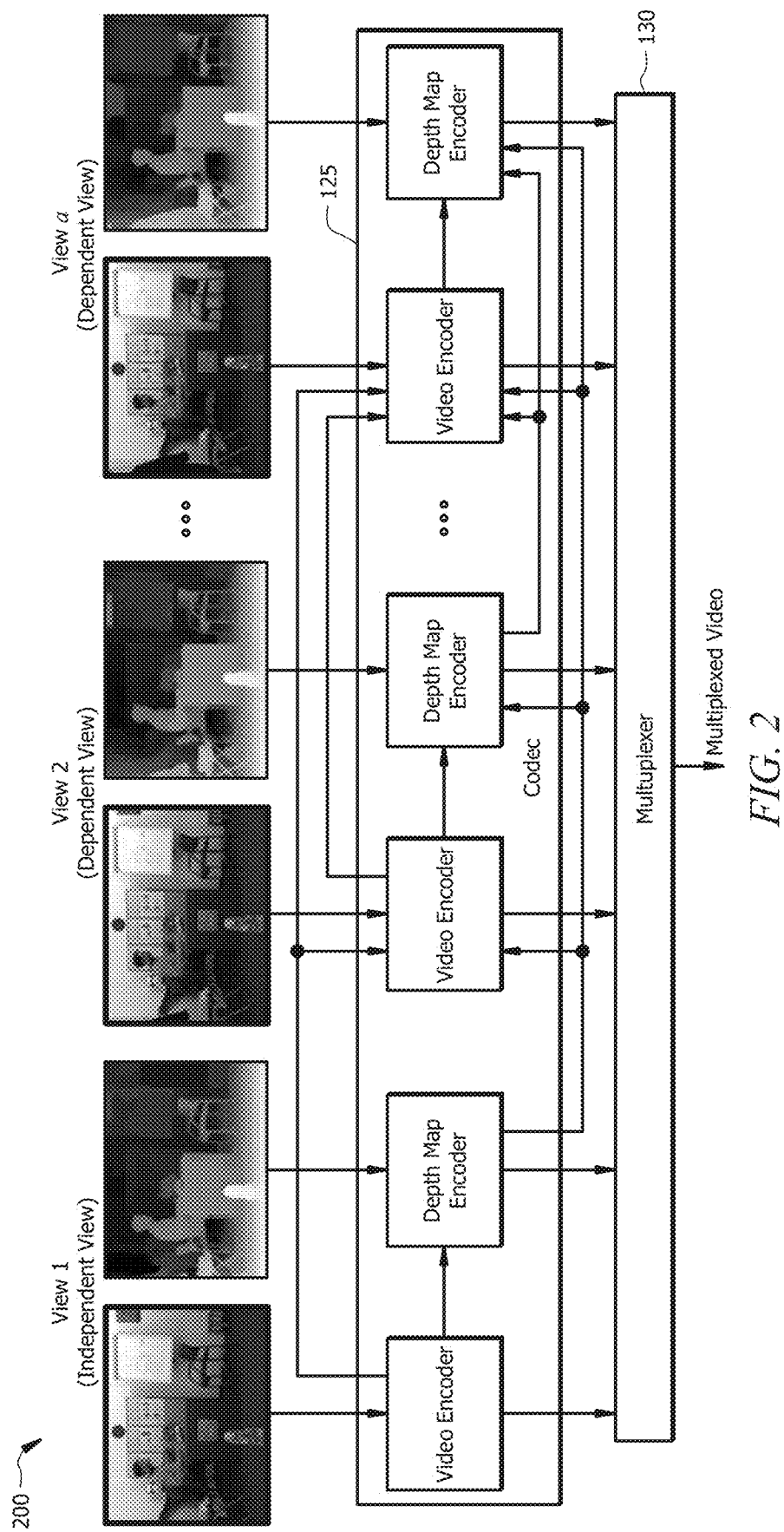
FIG. 2 is a schematic diagram of an encoding and multiplexing scheme for 3D video.

FIG. 2 is a schematic diagram of an encoding and multiplexing scheme 200 for 3D video. The scheme 200 shows a views corresponding to the a recording devices 105 in FIG. 1. As can be seen, the codec 125 separately encodes the views, and the multiplexer 130 multiplexes those encoded views to create a multiplexed video.

Each view comprises a video picture and a corresponding depth map. A depth map comprises data relating to the distance of the surfaces of objects from a viewpoint. That data may include information related to illuminance and chrominance. Illuminance is a measure of how much an incident light lights up a surface, and chrominance is a measure of color. That data may also include information related to IC.

View 1 is an independent view and the remaining views (i.e., view 2 through view a) are dependent views. The independent view, which may also be referred to as a reference view, comprises complete illuminance, chrominance, and other data. In contrast, the dependent views, which may also be referred to as current views, do not necessarily comprise complete illuminance, chrominance, and other data. Instead, the dependent views comprise disparity-compensated prediction (DCP) data referring to the illuminance, chrominance, and other data in the independent view. Alternatively, dependent views may comprise DCP data referring to any already-encoded view, including other dependent views. The independent view is determined based on various metrics that ensure that it is a good view to describe the dependent views. Once the independent view is determined, it is determined that the remaining views are dependent views.

Figure 3:
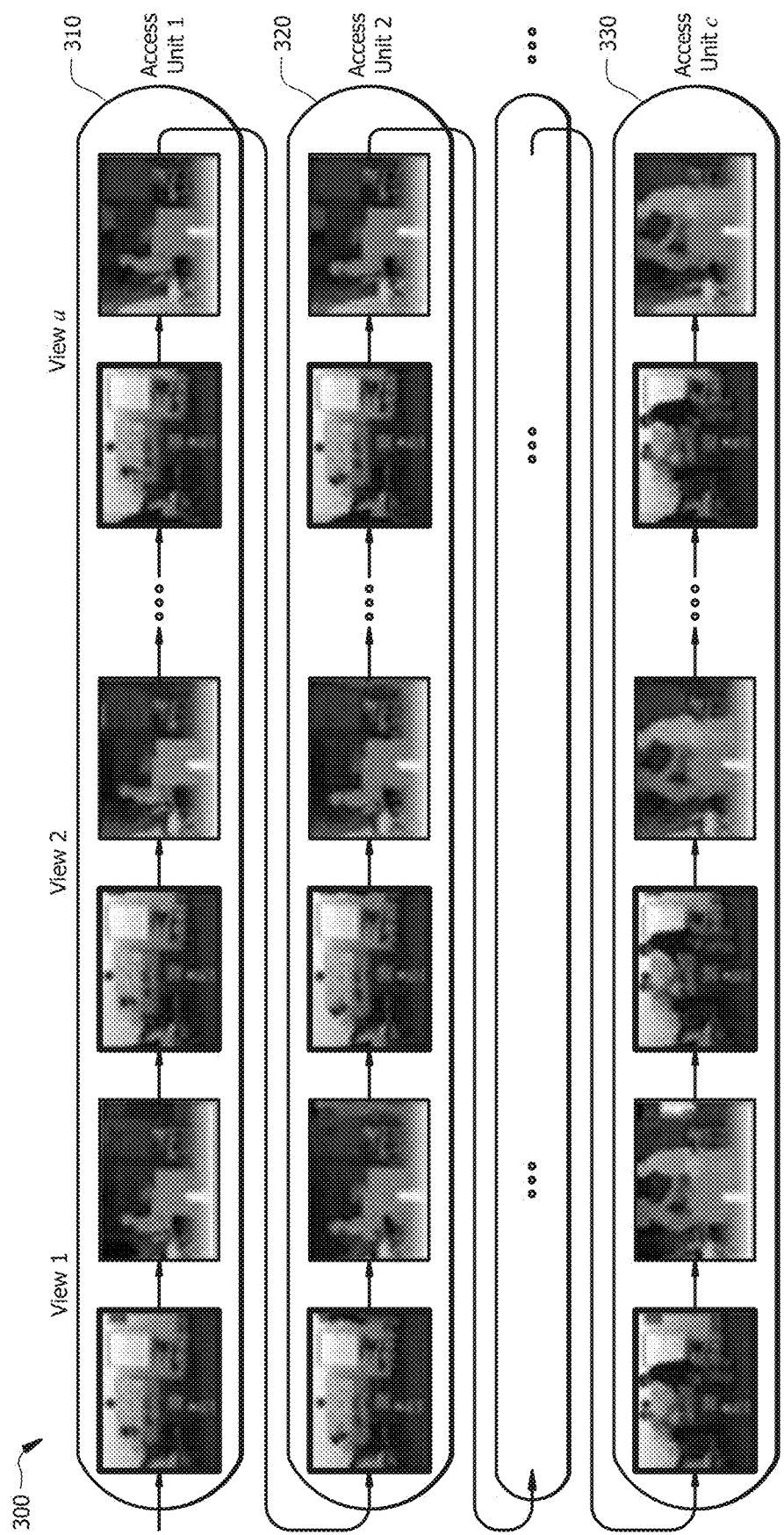
FIG. 3 is a diagram of an access unit structure for 3D video.

FIG. 3 is a diagram of an access unit structure 300 for 3D video. The structure 300 comprises access unit 1 310, access unit 2 320, access units 3 through c-1 (not shown), and access unit c 330. C is any positive integer. Each access unit comprises view 1, the independent view, and views 2 through a, the dependent views. For instance, view 1 in access unit 1 310 comprises complete illuminance, chrominance, and other data, and views 2 through a in access unit 1 310 comprise DCP data referring to view 1 in access unit 1 310. Similarly, view 1 in access unit 2 320 comprises complete illuminance, chrominance, and other data, and views 2 through a in access unit 2 320 comprise DCP data referring to view 1 in access unit 1 320, and so on until access unit c 330. Thus, an access unit is a set of all views corresponding to a same time instant.

Because the views in each access unit are taken from different angles, they each will comprise different illuminance information. However, the views are of the same object or objects, so their illuminance information will have significant similarities. The DCP data for the dependent views may therefore describe those similarities instead of the complete illuminance, chrominance, and other data. By doing so, the dependent views may save at least 80% of the data required to describe complete illuminance, chrominance, and other data.

DCP comprises illumination compensation (IC). As the name implies, IC compensates the illumination of each dependent view with respect to the independent view. However, prior IC approaches such as that described in Zhang may still be improved in terms of efficiency and other aspects.

Disclosed herein are embodiments for improved IC. Specifically, the embodiments provide for IC refinement. The IC refinement, which may be necessitated by an inaccurate disparity vector (DV), reduces a pairing mismatch between neighboring pixels used for IC. Different pairings of neighboring pixels are compared in order to determine an optimal pairing. Once an optimal pairing is determined, a more accurate IC may be implemented. Thus, the IC refinement provides an overall improvement in 3D video coding performance.

Figure 4:
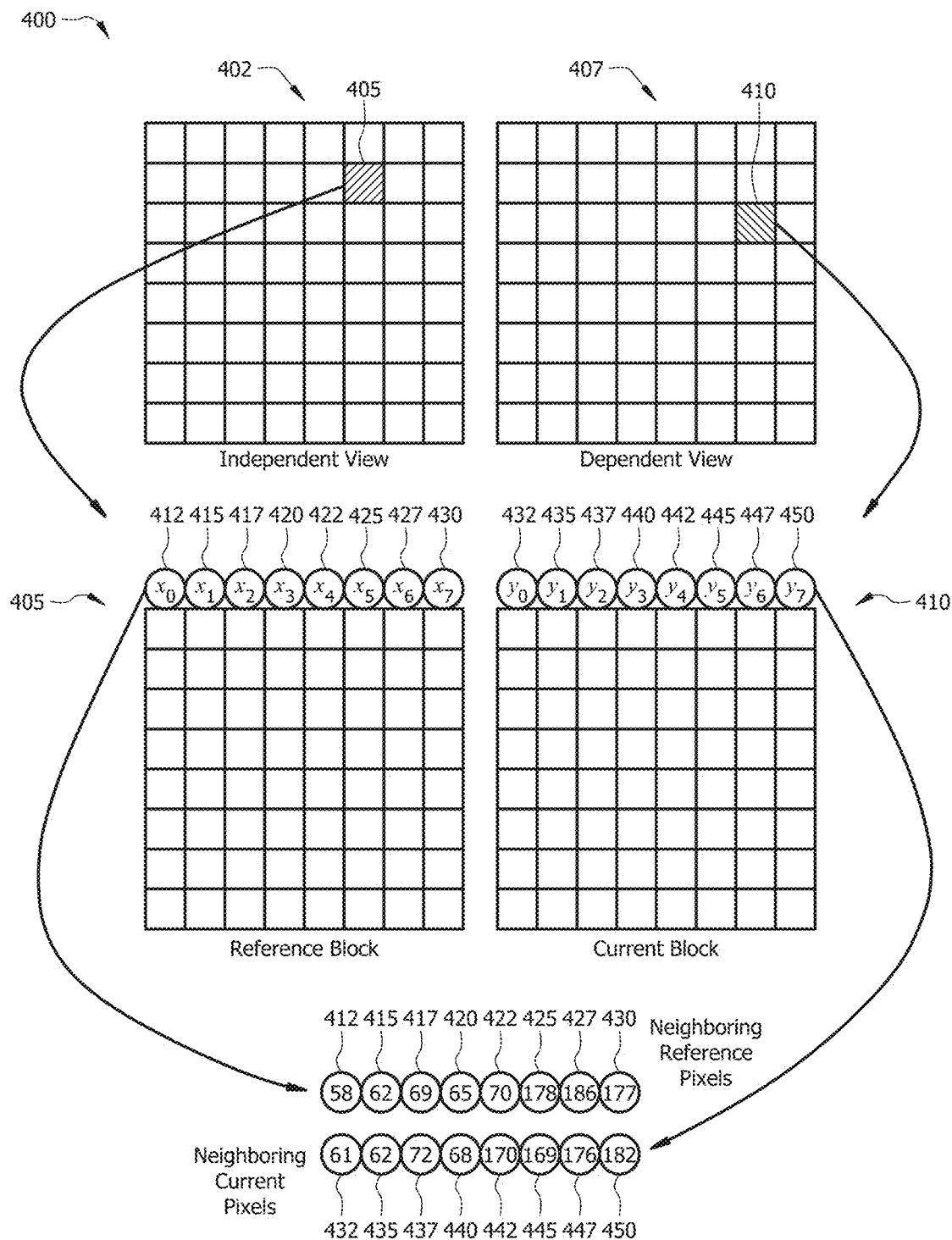
FIG. 4 is a diagram of an IC scheme.

FIG. 4 is a diagram of an IC scheme 400. A codec, for instance the codecs 115, the codec 125, or the codecs 145, implements the IC scheme 400. The IC scheme 400 begins with an independent view 402 and a dependent view 407. The independent view 402 comprises 64 reference blocks, and the dependent view comprises 64 current blocks. The dependent view 407 comprises data referring to the illuminance, chrominance, and other data in the independent view 402. For instance, a current block 410 comprises data referring to the illuminance, chrominance, and other data in a reference block 405.

A DV matches each current block to a reference block. The current blocks in the dependent view 407 may or may not be matched to similarly placed reference blocks in the independent view 402. For instance, the current block 410 is matched to the reference block 405 even though the current block 410 is one row lower than and one column to the right of the reference block 405.

The reference block 405 is associated with a row of neighboring reference pixels labeled $x_i$ for i=0, 1, ..., N-1. N is any positive integer equal to the number of pixels in each row. In this case, the reference blocks in the independent view 402, including the reference block 405, comprise rows of 8 pixels, so N=8. The neighboring reference pixels are therefore labeled $x_0$ 412, $x_1$ 415, $x_2$ 417, $x_3$ 420, $x_4$ 422, $x_5$ 425, $x_6$ 427, and $x_7$ 430. The neighboring reference pixels $x_{0-7}$ 412-430 may also be referred to as neighboring reference samples or simply neighboring pixels. The neighboring reference pixels $x_{0-7}$ 412-430 are in a bottom row of a reference block directly above, or adjacent to, the reference block 405 in the independent view 402.

Similarly, the current block 410 is associated with a row of neighboring current pixels labeled $y_i$ for i=0, 1, ..., N-1. Because N=8, the neighboring current pixels are labeled $y_0$ 432, $y_1$ 435, $y_2$ 437, $y_3$ 440, $y_4$ 442, $y_5$ 445, $y_6$ 447, and $y_7$ 450. The neighboring current pixels $y_0$-$y_7$ 432-450 may also be referred to as neighboring current samples or simply neighboring pixels. The neighboring current pixels $y_0$-$y_7$ 432-450 are in a bottom row of a current block directly above, or adjacent to, the current block 410 in the dependent view 407. The neighboring current pixels $y_0$-$y_7$ 432-450 are matched to the neighboring reference pixels $x_{0-7}$ 412-430 based on the DV.

IC is performed one row at a time so that IC for the current pixels in the first row in the current block 410 is calculated based on the reference pixels in the first row in the reference block 405. Then IC for the current pixels in the second row in the current block 410 is calculated based on the reference pixels in the second row in the reference block 405, and so on. IC is performed sequentially across each row.

A linear IC model is used to perform IC for the current pixels based on the reference pixels. The model uses IC parameters, including parameter a and parameter b. A is a scaling factor, and b is an offset. A and b are derived by minimizing the following equation:

$$E(a,b)=\Sigma_i(y_i-ax_i-b)^2+\lambda(a-1)^2, \quad (1)$$

where $y_i$ is a pixel value for the corresponding neighboring current pixel, $x_i$ is a pixel value for the corresponding neighboring reference pixel, and $\lambda$ is a regularization parameter. Then a is derived as follows:

$$a = \frac{N\Sigma_i x_i y_i - \Sigma_i x_i \Sigma_i y_i + \lambda}{N\Sigma_i x_i x_i - \Sigma_i x_i \Sigma_i x_i + \lambda}, \quad (2)$$

where N is the number of pixels in a row and $\lambda$ is set equal to $\Sigma_i x_i x_i \gg 7$ or $$\Sigma_i \frac{x_i^2}{128}.$$

A is typically close to 1. Finally, b is derived as follows:

$$b=\Sigma_i y_i - a*\Sigma_i x_i. \quad (3)$$

As shown, the pixel values for the neighboring reference pixels $x_0$ 412, $x_1$ 415, $x_2$ 417, $x_3$ 420, $x_4$ 422, $x_5$ 425, $x_6$ 427, and $x_7$ 430 are 58, 62, 69, 65, 70, 178, 186, and 177, respectively. The pixel values for the neighboring current pixels $y_0$ 432, $y_1$ 435, $y_2$ 437, $y_3$ 440, $y_4$ 442, $y_5$ 445, $y_6$ 447, and $y_7$ 450 are 61, 62, 72, 68, 170, 169, 176, and 182, respectively. The pixel values represent illuminance in arbitrary or constant units. The pixel values range from 0 to 255, where 0 represents no or minimum illuminance and 255 represents maximum illuminance. After calculating a and b, pixel values for each current pixel in the current block 410 are calculated as follows:

$$y_i=(a*x_i)+b. \quad (4)$$

Pixel values for the neighboring reference pixels $x_{0-7}$ 412-430 and the neighboring current pixels $y_0$-$y_7$ 432-450 are already known. However, when a reference block is at an edge of the independent view 402 or when a current block is at an edge of the dependent view, the pixel values of neighboring reference pixels or neighboring current pixels may not be known. In that case, as one of ordinary skill in the art would understand, pixel values are calculated based on techniques described in Zhang and other references.

To further simply IC calculation, the neighboring reference pixels and the neighboring current pixels are decimated by a factor of two, meaning that the pixel values for only every other neighboring reference pixel and every other neighboring current pixel are used to calculate a and b. For instance, the neighboring reference pixels $x_0$ 412, $x_2$ 417, $x_4$ 422, and $x_6$ 427, as well as the neighboring current pixels $y_0$ 432, $y_2$ 437, $y_4$ 442, and $y_6$ 447, are used. In that case, the neighboring reference pixels $x_0$ 412, $x_2$ 417, $x_4$ 422, and $x_6$ 427 may be referred to as new neighboring reference pixels $x_0$ 412, $x_1$ 417, $x_2$ 422, and $x_3$ 427, respectively. Similarly, the neighboring current pixels $y_0$ 432, $y_2$ 437, $y_4$ 442, and $y_6$ 447 may be referred to as new neighboring current pixels $y_0$ 432, $y_1$ 437, $y_2$ 442, and $y_3$ 447, respectively.

The differences in the pixel values between the new neighboring reference pixels $x_0$-$x_3$ 412-427 and the new neighboring current pixels $y_0$-$y_3$ 432-447 are similar, except for the new reference pixel $x_2$ 422 and the new current pixel $y_2$ 442. Specifically, the pixel value for the new neighboring reference pixel $x_2$ 422 is 70, while the pixel value for the new neighboring current pixel $y_2$ 442 is 170. That difference is relatively high considering the 255 maximum pixel value, and that difference is significantly more than the differences between each other set of new neighboring reference pixels $x_3$ 412-427 and new neighboring current pixels $y_0$-$y_3$ 432-447, thus suggesting that the DV may be less accurate than desired. Accordingly, an IC refinement scheme is needed.

Figure 5:
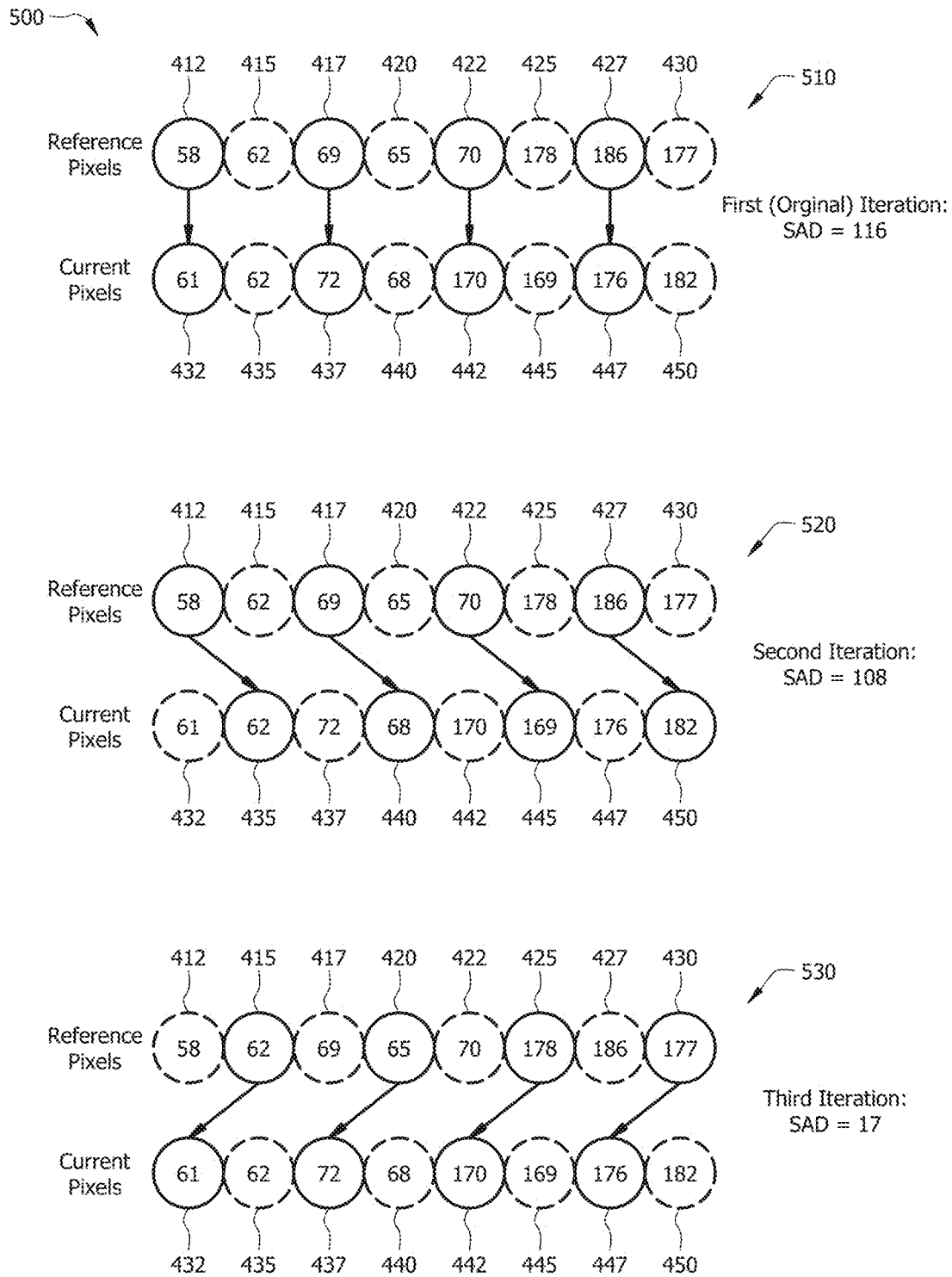
FIG. 5 is a diagram of an IC refinement scheme according to an embodiment of the disclosure.

FIG. 5 is a diagram of an IC refinement scheme 500 according to an embodiment of the disclosure. A codec, for instance the codecs 115, the codec 125, or the codecs 145, implements the IC refinement scheme 500 to refine the scheme 400. The scheme 500 comprises a first (original) iteration 510, a second iteration 520, and a third iteration 530. For each iteration, the neighboring reference pixels $x_{0-7}$ 412-430 and the neighboring current pixels $y_0$-$y_7$ 432-450 are decimated by a factor of two.

The first iteration 510 is the same as that shown for the neighboring reference pixels $x_0$-$x_7$ 412-430 and the neighboring current pixels $y_0$-$y_7$ 432-450 in FIG. 4. For instance, the neighboring reference pixel $x_0$ 412 is paired to the neighboring current pixel $y_0$ 432, the neighboring reference pixel $x_2$ 417 is paired to the neighboring current pixel $y_2$ 437, and so on. The pairings between the neighboring reference pixels $x_0$-$x_7$ 412-430 and the neighboring current pixels $y_0$-$y_7$ 432-450 may be referred to as positional pairings. The first iteration 510 therefore shows a first positional pairing.

Because the neighboring reference pixels $x_0$-$x_7$ 412-430 and the neighboring current pixels $y_0$-$y_8$ 432-450 are decimated by a factor of two, the neighboring reference pixels $x_0$ 412, $x_2$ 417, $x_4$ 422, and $x_6$ 427 are referred to as new neighboring reference pixels $x_0$, $x_1$, $x_2$, and $x_3$, respectively. Similarly, the neighboring current pixels $y_0$ 432, $y_2$ 437, $y_4$ 442, and $y_6$ 447 are referred to as new neighboring current pixels $y_0$, $y_1$, $y_2$, and $y_3$, respectively. The dashed lines for the neighboring reference pixels $x_1$ 415, $x_3$ 420, $x_5$ 425, and $x_7$ 430 and for the neighboring current pixels $y_1$ 435, $y_3$ 440, $y_5$ 445, and $y_7$ 450 signify that they are not used to determine a and b.

Then the sum of absolute differences (SAD) is calculated based on each pair of the new neighboring reference pixels $x_0$-$x_3$ 412-427 and the new neighboring current pixels $y_0$-$y_3$ 432-447 as follows:

$$SAD = \sum_{n=0}^{\frac{N}{2}-1} |y_{2n} - x_{2n}|, \quad (5)$$

where n is an arbitrary counting constant. As shown in FIG. 5, N=8. N is divided by two in equation (5) due to the decimation. Equation (5) is applied as follows:

$$SAD=\Sigma|58-61|+|69-72|+|70-170|+|186-176|$$

$$SAD=116.$$

The SAD of 116 is relatively high and is mostly due to the difference between 70, the pixel value for the new neighboring reference pixel $x_2$ 422, and 170, the pixel value for the new neighboring current pixel $y_2$ 442. The SAD of 116 indicates that IC refinement is needed.

The second iteration 520 is similar to the first iteration 510, but the pairing is shifted one pixel to the right so that the neighboring reference pixel $x_0$ 412 is paired to the neighboring current pixel $y_1$ 435, the neighboring reference pixel $x_2$ 417 is paired to the neighboring current pixel $y_3$ 440, and so on. The second iteration 520 therefore shows a second positional pairing. Because the neighboring reference pixels $x_0$-$x_7$ 412-430 and the neighboring current pixels $y_0$-$y_8$ 432-450 are decimated by a factor of two, the neighboring reference pixels $x_0$ 412, $x_2$ 417, $x_4$ 422, and $x_6$ 427 are referred to as new neighboring reference pixels $x_0$, $x_1$, $x_2$, and $x_3$, respectively. Similarly, the neighboring current pixels $y_1$ 435, $y_3$ 440, $y_5$ 445, and $y_7$ 450 are referred to as new neighboring current pixels $y_0$, $y_1$, $y_2$, and $y_3$, respectively. The dashed lines for the neighboring reference pixels $x_1$ 415, $x_3$ 420, $x_5$ 425, and $x_7$ 430 and for the neighboring current pixels $y_0$ 432, $y_2$ 437, $y_4$ 442, and $y_6$ 447 signify that they are not used to determine a and b.

Then the SAD is calculated based on each pair of the new neighboring reference pixels $x_0$-$x_3$ 412-427 and the new neighboring current pixels $y_0$-$y_3$ 435-450 as follows:

$$SAD = \sum_{n=0}^{\frac{N}{2}-1} |y_{2n+1} - x_{2n}|. \quad (6)$$

Equation (6) is applied as follows:

$$SAD=\Sigma|58-62|+|69-68|+|70-169|+|186-182|$$

$$SAD=108.$$

The SAD of 108 is still relatively high and is mostly due to the difference between 70, the pixel value for the new neighboring reference pixel $x_2$ 422, and 169, the pixel value for the new neighboring current pixel $y_2$ 445. The SAD of 108 indicates that IC refinement is still needed.

The third iteration 530 is similar to the first iteration 510 and the second iteration 520, but the pairing is shifted one pixel to the left so that the neighboring reference pixel $x_1$ 415 is paired to the neighboring current pixel $y_0$ 432, the neighboring reference pixel $x_3$ 420 is paired to the neighboring current pixel $y_2$ 437, and so on. The third iteration 530 therefore shows a third positional pairing. Because the neighboring reference pixels $x_0$-$x_7$ 412-430 and the neighboring current pixels $y_0$-$y_8$ 432-450 are decimated by a factor of two, the neighboring reference pixels $x_1$ 415, $x_3$ 420, $x_5$ 425, and $x_7$ 430 are referred to as new neighboring reference pixels $x_0$, $x_1$, $x_2$, and $x_3$, respectively. Similarly, the neighboring current pixels $y_0$ 432, $y_2$ 437, $y_4$ 442, and $y_6$ 447 are referred to as new neighboring current pixels $y_0$, $y_1$, $y_2$, and $y_3$, respectively. The dashed lines for the neighboring reference pixels $x_0$ 412, $x_2$ 417, $x_4$ 422, and $x_6$ 427 and for the neighboring current pixels $y_1$ 435, $y_3$ 440, $y_5$ 445, and $y_7$ 450 signify that they are not used to determine a and b.

Then the SAD is calculated based on each pair of the new neighboring reference pixels $x_0$-$x_3$ 415-430 and the new neighboring current pixels $y_0$-$y_3$ 432-447 is calculated as follows:

$$SAD = \sum_{n=0}^{\frac{N}{2}-1} |y_{2n} - x_{2n+1}|. \quad (7)$$

Equation (7) is applied as follows:

$$SAD=\Sigma|62-61|+|65-72|+|178-170|+|177-176|$$

$$SAD=17.$$

The SAD of 17 is relatively low and indicates that the third iteration 530 provides the best, or optimum, IC refinement among the first iteration 510, the second iteration 520, and the third iteration 530. The positional pairing in the third iteration 530 may therefore be referred to as an optimal pairing.

The codec compares the three SADs of 116, 108, and 17, determines that the third iteration 530 is the optimal pairing because the SAD of 17 for the third iteration 530 is the lowest, and calculates a and b based on the optimal pairing in the third iteration 530. Thus, pixel values for the current pixels in the current block 410 may be determined based on a, b, and pixel values for the reference pixels in the reference block 405. In a first embodiment, the codec calculates and encodes a, b, an indicator of the optimal pairing, and the pixel values of the reference pixels for transmission. In a second embodiment, the codec calculates and encodes only an indicator of the optimal pairing and the pixel values of the reference pixels for transmission, and another codec decodes the indicator of the optimal pairing and the pixel values of the reference pixels and calculates a and b based on the optimal pairing. In a third embodiment, the codec calculates a and b and encodes a, b, and an indicator of the optimal pairing for transmission. In a fourth embodiment, the codec calculates and encodes only an indicator of the optimal pairing for transmission, and another codec decodes the indicator of the optimal pairing and calculates a and b based on the optimal pairing.

First, while the IC scheme 400 and the IC refinement scheme 500 demonstrate IC for 64 reference blocks per independent view, 64 current blocks per dependent view, 64 reference pixels per reference block, and 64 current pixels per current block, the IC scheme 400 may perform IC and the IC refinement scheme 500 may perform IC refinement for any number of reference blocks per independent view, current blocks per dependent view, reference pixels per reference block, and current pixels per current block. Second, any suitable neighboring reference pixels and neighboring current pixels may be used. Third, while the IC scheme 400 demonstrates IC and the IC refinement scheme 500 demonstrates IC refinement for a row of reference pixels and a row of current pixels at a time, the IC scheme 400 may perform IC and the IC refinement scheme 500 may perform IC refinement for any suitable number of rows, number of columns, or other pixel groupings.

Figure 6:
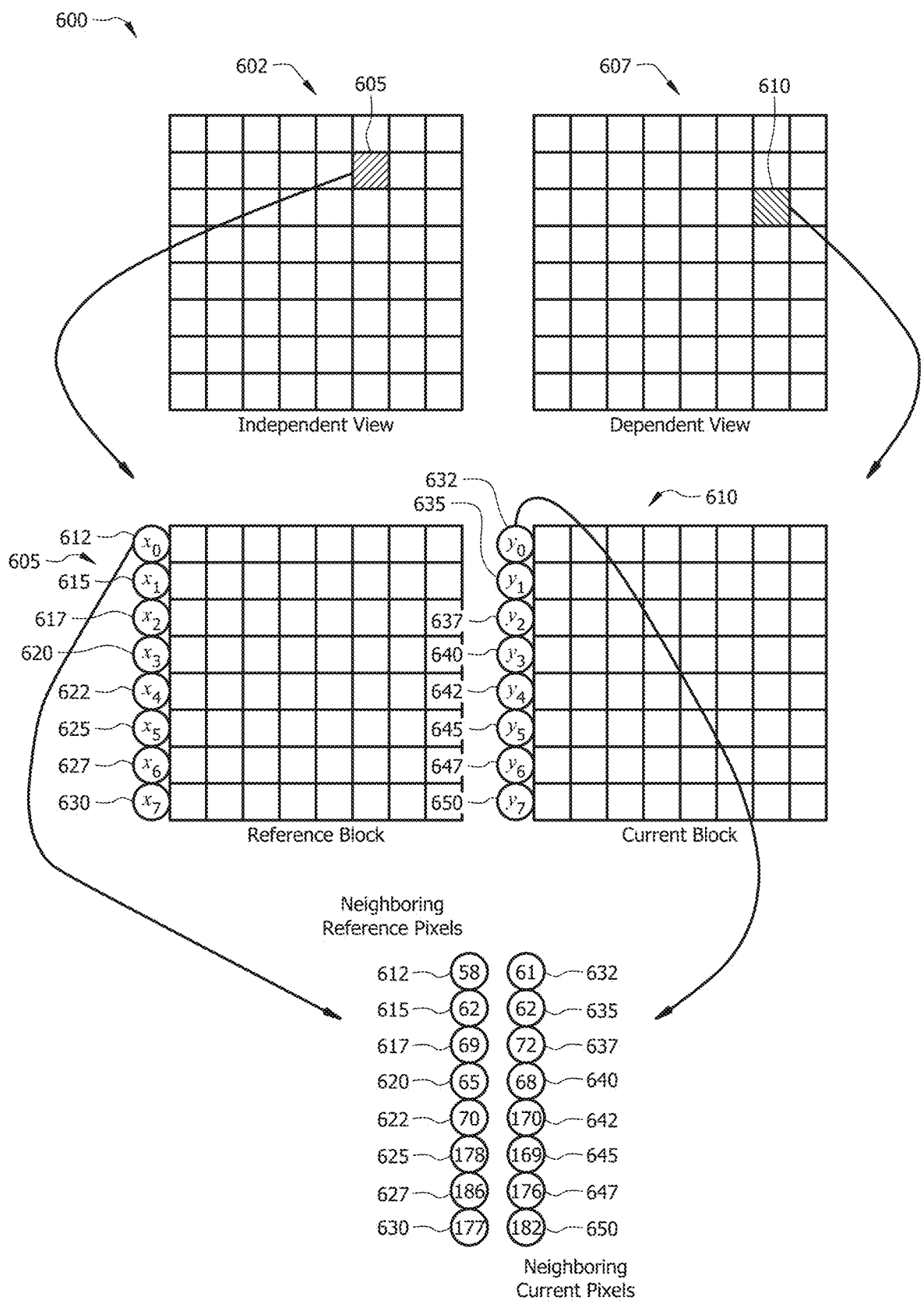
FIG. 6 is a diagram of another IC scheme.

FIG. 6 is a diagram of another IC scheme 600. The scheme 600 is similar to the IC scheme 400 in FIG. 4. However, unlike for the scheme 400, which performs IC one row at a time, the scheme 600 performs IC one column at a time. For instance, IC for current pixels 632-650 in a current block 610 are based on reference pixels $x_0$-$x_7$ 612-630 in a reference block 605 by applying equations (1)-(4). To refine the scheme 600, a codec, for instance the codecs 115, the codec 125, or the codecs 145, implements an IC refinement scheme similar to the IC refinement scheme 500 by applying equations (5)-(7).

Fourth, while decimation by a factor of two is described, the IC scheme 400 and the IC refinement scheme 500 may apply any decimation factor. Fifth, while the SAD is used for the IC refinement scheme 500, other approaches such as the sum of absolute errors (SAE), the sum of squared differences (SSD), the sum of squared errors (SSE), the sum of absolute transformed differences (SATD), the mean absolute difference (MAD), the mean absolute error (MAE), the mean squared difference (MSD), and the mean squared error (MSE) may be used. Sixth, while the IC refinement scheme 500 is described in relation to IC, the same techniques may be applied to other relationships between references pixels and current pixels.

Seventh, the IC refinement scheme 500 may perform any suitable number of iterations. Eighth, if a reference block and a corresponding current block are less than a specified size, for instance if a row of pixels in the reference block is 4 pixels long or less, then the IC scheme 400 may be implemented without the IC refinement scheme 500. Ninth, if a reference block and a corresponding current block do not have the same number of pixels in their rows and columns, for instance if the reference block is 8×7 pixels and not 8×8 pixels, then the IC scheme 400 may be implemented without the IC refinement scheme 500.

Tenth, the IC refinement scheme 500 demonstrates shifting of only one pixel to the right (e.g., from the new neighboring reference pixel $x_0$ 412 to the new neighboring current pixel $y_0$ 435 in the second iteration 520 as indicated by the right-diagonal arrow connecting the two) or only one pixel to the left (e.g., from the new neighboring reference pixel $x_0$ 415 to the new neighboring current pixel $y_0$ 432 in the third iteration 530 as indicated by the left-diagonal arrow connecting the two). However, the IC refinement scheme 500 may perform shifting of more than one pixel. The shifting may be referred to as an index difference. For instance, shifting of one pixel to the right (e.g., from the new neighboring reference pixel $x_0$ 412 to the new neighboring current pixel $y_0$ 435 in the second iteration 520) may indicate an index difference of +1, shifting of one pixel to the left (e.g., from the new neighboring reference pixel $x_0$ 415 to the new neighboring current pixel $y_0$ 432) may indicate an index difference of −1, and so on. Alternatively, the shifting can be viewed as using different pairing directions. For instance, the arrows in the first iteration 510 show a 0 degree (°) angle with respect to the bottom of the page, the arrows in the second iteration 520 show a +45° angle with respect to the bottom of the page, and the arrows in the third iteration 530 show a −45° angle with respect to the bottom of the page. In that case, the IC refinement scheme 500 may perform shifting of any suitable angle.

FIG. 7 is a graph 700 of modeled performance for the IC refinement scheme 500 in FIG. 5. The first column of the graph 700 shows different videos provided to model performance. For instance, the first video is a video of balloons.

The second column of the graph 700 shows coding performance for an independent view of the corresponding video, the third column of the graph 700 shows coding performance for a first dependent view of the corresponding video, and the fourth column of the graph 700 shows coding performance for a second dependent view of the corresponding video. Positive percentages indicate coding loss, and negative percentages indicate coding gain. As shown, the coding performance remains unchanged for the independent view because the independent view is fully encoded and does not have the IC refinement scheme 500 applied to it. The first dependent view shows an average of 0.04% coding gain across all of the videos. Similarly, the second dependent view shows an average of 0.10% coding gain across all of the videos.

The fifth column of the graph 700 shows video peak signal-to-noise ratio (PSNR) per video bitrate, the sixth column of the graph 700 shows video PSNR per total bit rate, and the seventh column of the graph 700 shows synthesized PSNR per total bit rate. Positive percentages indicate a PSNR increase, and negative percentages indicate a PSNR decrease. As shown, the video PSNR per video bitrate shows an average 0.02% reduction in PSNR across all of the videos. Similarly, the video PSNR per total bitrate shows an average 0.02% reduction in PSNR across all of the videos. Finally, the synthesized PSNR per total bitrate shows an average 0.05% reduction in PSNR across all of the videos.

The eighth column of the graph 700 shows encoding time increase, the ninth column of the graph 700 shows decoding time increase, and the tenth column of the graph 700 shows rendering time increase. Percentages greater than 100% indicate an increase in time, and percentages less than 100% indicate a decrease in time. As shown, the encoding time shows an average 1.9% increase across all of the videos, the decoding time shows an average 8.7% increase across all of the videos, and the rendering time shows an average 6.1% increase across all of the videos. Thus, the IC refinement scheme 500 shows good coding performance and PSNR reduction while not significantly increasing encoding, decoding, and rendering times.

Figure 8:
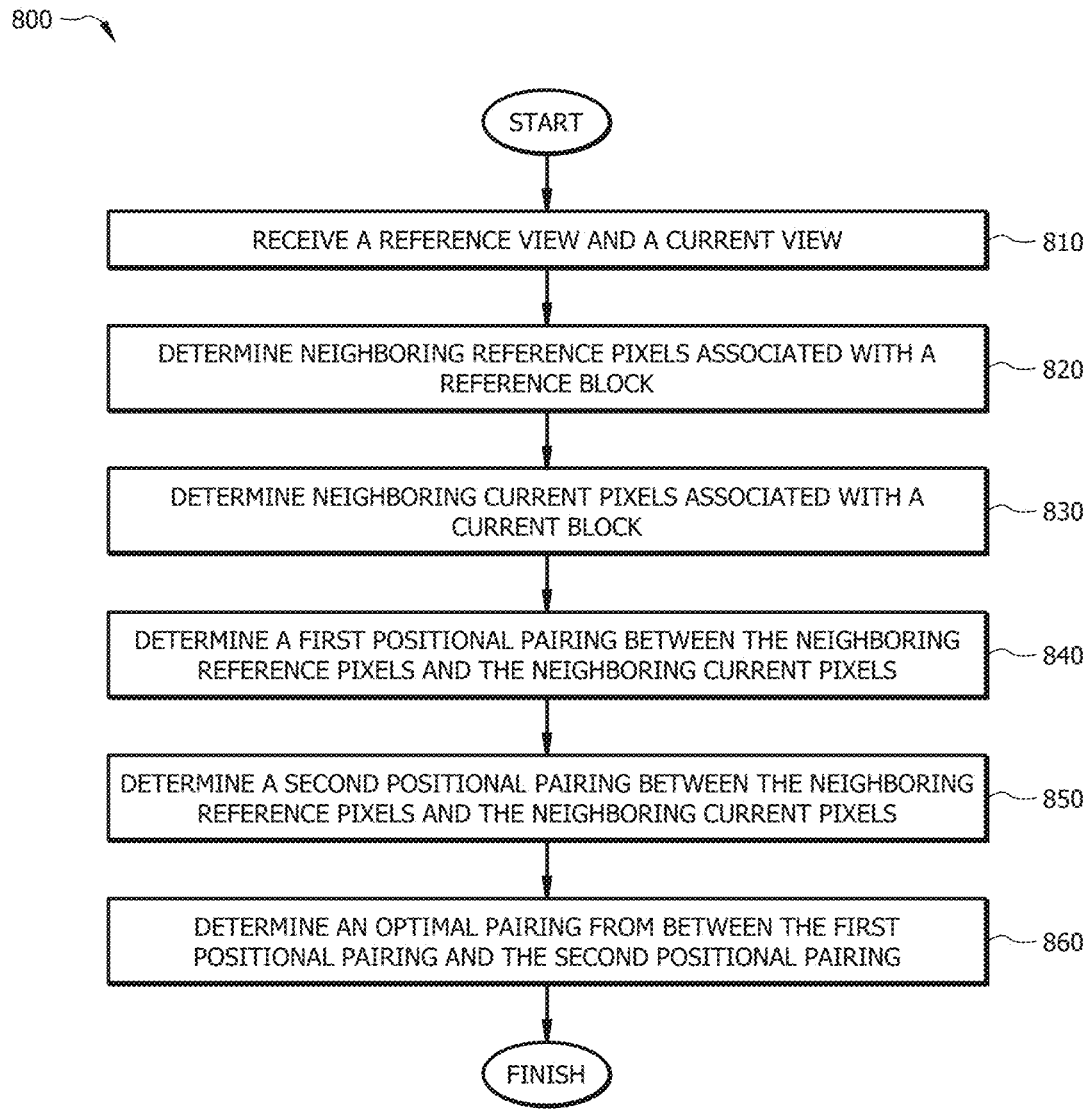
FIG. 8 is a flowchart illustrating a method of IC refinement according to an embodiment of the disclosure.

FIG. 8 is a flowchart illustrating a method 800 of IC refinement according to an embodiment of the disclosure. A codec, for instance the codecs 115 or the codec 125, performs at least part of the method 800. At step 810, a reference view and a current view are received. For instance, the codec 125 receives video view from the recording devices 105. The video view comprise the independent view 402, which may also be referred to as a reference view, as well as the dependent view 407, which may also be referred to as a current view. The reference view comprises a reference block, for instance the reference block 405. The current view comprises a current block, for instance the current block 410.

At step 820, neighboring reference pixels associated with the reference block are determined. For instance, the neighboring reference pixels $x_{0-7}$ 412-430 are determined. At step 830, neighboring current pixels associated with the current block are determined. For instance, the neighboring current pixels $y_0$-$y_7$ 432-450 are determined.

At step 840, a first positional pairing between the neighboring reference pixels and the neighboring current pixels is determined. For instance, the first positional pairing is the first positional pairing for the first iteration 510. At step 850, a second positional pairing between the neighboring reference pixels and the neighboring current pixels is determined. For instance, the second positional pairing is the second positional pairing for the second iteration 520.

Finally, at step 860, an optimal pairing from between the first positional pairing and the second positional pairing is determined. For instance, using equations (5) and (6), it is determined that the first positional pairing for the first iteration 510 produces a SAD of 116 and the second positional pairing for the second iteration 520 produces a SAD of 108, so the second positional pairing for the second iteration 520 is the optimal pairing. Of course, the codec may determine additional positional pairings such as the positional pairing for the third iteration 530 and may determine the optimal pairing based on those additional positional pairings.

Figure 9:
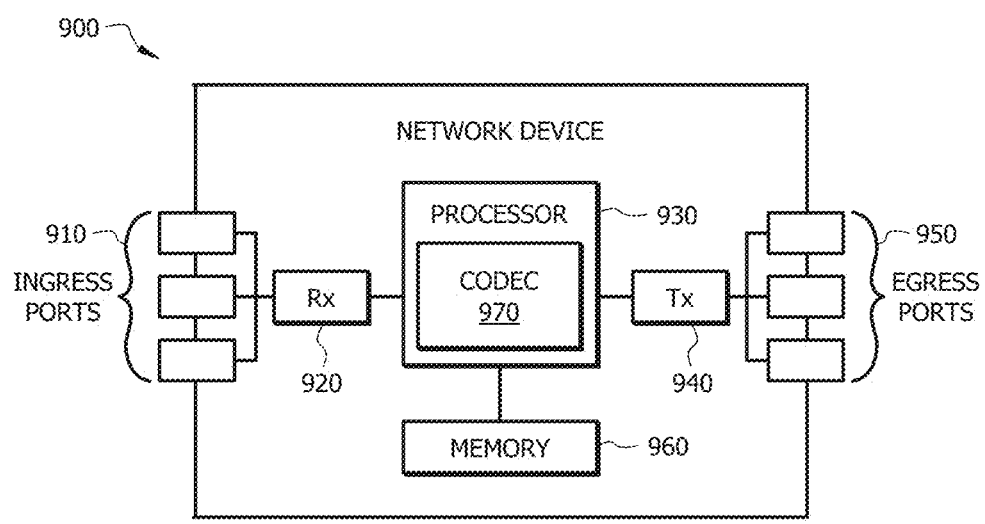
FIG. 9 is a schematic diagram of a network device.

FIG. 9 is a schematic diagram of a network device 900. The network device 900 is suitable for implementing the disclosed embodiments, including the IC scheme 400, the IC refinement scheme 500, and the method 800. The network device 900 comprises ingress ports 910 and receiver units (Rx) 920 for receiving data; a processor, logic unit, or central processing unit (CPU) 930 to process the data; transmitter units (Tx) 940 and egress ports 950 for transmitting the data; and a memory 960 for storing the data. The network device 900 may also comprise optical-to-electrical (OE) components and electrical-to-optical (EO) components coupled to the ingress ports 910, receiver units 920, transmitter units 940, and egress ports 950 for egress or ingress of optical or electrical signals.

The processor 930 may be implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the ingress ports 910, receiver units 920, transmitter units 940, egress ports 950, and memory 960. The processor 930 comprises a codec 970 similar to the codecs 115, 125, 145. The codec 970 performs at least part of the method 800. The inclusion of the codec 970 therefore provides an improvement to the functionality of the device 900. The codec 970 also effects a transformation of the device 900 to a different state. Alternatively, the codec 970 is implemented as instructions stored in the memory 960 and executed by the processor 930.

The memory 960 comprises one or more disks, tape drives, and solid-state drives and may be used as an overflow data storage device, to store programs when such programs are selected for execution, and to store instructions and data that are read during program execution. The memory 960 may be volatile and non-volatile and may be read-only memory (ROM), random-access memory (RAM), ternary content-addressable memory (TCAM), and static random-access memory (SRAM).

A method comprising: obtaining a reference view and a current view, wherein the reference view comprises a reference block and the current view comprises a current block; obtaining first type pixels, wherein the first type pixels comprise neighboring pixels associated with the reference block; obtaining second type pixels, wherein the second type pixels comprise neighboring pixels associated with the current block; determining a first positional pairing between the first type pixels and the second type pixels; determining a second positional pairing between the first type pixels and the second type pixels; and determining an optimal pairing between the first positional pairing and the second positional pairing, and the optimal pairing associated with the first type pixels and the second type pixels is used for illumination compensation(IC) computation. signaling an indicator of the optimal pairing.

The method above, further comprising: calculating a scaling factor a and an offset b based on the first type pixels and the second type pixels;

The method above, wherein a positional pairing represents the corresponding positional relation between the first type pixels and the second type pixels.

The method above, wherein the reference block is associated with the current block based on a disparity vector (DV).

The method above, wherein the optimal pairing is determined based on the first type pixels and the second type pixels, and wherein the optimal pairing having the minimal difference the first type pixels and the second type pixels.

The method above, wherein the method of determining the optimal pairing between the first type pixels and the second type pixels is to calculate the minimal difference using any one of the metrics, squared differences (SSDs); squared errors (SSEs); absolute transformed differences (SATDs); mean absolute differences (MADs); mean absolute errors (MAEs); mean squared differences (MSDs); or mean squared errors (MSEs).

A method comprising: obtaining a reference view and a current view, wherein the reference view comprises a reference block and the current view comprises a current block; obtaining first type pixels, wherein the first type pixels comprise neighboring pixels associated with the reference block; obtaining second type pixels, wherein the second type pixels comprise neighboring pixels associated with the current block; obtaining an indicator for the current block, wherein the indicator signaling a positional paring of the first type pixels and the second type pixels. using the positional paring associated with the first type pixels and the second type pixels for illumination compensation(IC) computation for the current block.

The method above, wherein the reference block is associated with the current block based on a disparity vector (DV).

The method above, wherein a positional pairing represents the corresponding positional relation between the first type pixels and the second type pixels.

The method above, further comprising: calculating a scaling factor a and an offset b based on the first type pixels and the second type pixels;

The method above, wherein the first positional pairing and the second positional pairing are based on index differences between the first type pixels and the second type pixels.

The method above, wherein the index differences between the first type pixels and the second type pixels is any one of the values −2, −1, 0, 1 or 2.

The method above, wherein the first positional pairing and the second positional pairing are based on pairing directions between the first type pixels and the second type pixels.

The method above, wherein the pairing directions between the first type pixels and the second type pixels is any one of the angles, −45 degree, 0 degree, or 45 degree.

The method above, wherein the method is skipped for a certain size of block in illumination compensation (IC) computation.

The method above, wherein the size of block is large than or equals to 4 and small than or equals to 16.

An apparatus comprising: an extractor configured to obtain video views comprising a reference view and a current view, wherein the reference view comprises a reference block and the current view comprises a current block; and a processor coupled to the receiver and configured to: obtain first type pixels, wherein the first type pixels comprise neighboring pixels associated with the reference block; obtain second type pixels, wherein the second type pixels comprise neighboring pixels associated with the current block; determine a first positional pairing between the first type pixels and the second type pixels; determine a second positional pairing between the first type pixels and the second type pixels; and determine an optimal pairing between the first positional pairing and the second positional pairing, and the optimal pairing associated with the first type pixels and the second type pixels is used for illumination compensation(IC) computation.

The apparatus above, wherein the processor is further configured to: calculate a scaling factor a and an offset b based on the first type pixels and the second type pixels The apparatus above, further comprising a signal processing module coupled to the processor and configured to signal an indicator of the optimal pairing.

The apparatus above, wherein the processor is further configured to associate the reference block to the current block based on a disparity vector (DV).

The apparatus above, wherein the processor is further configured to determine the optimal pairing based on the first type pixels and the second type pixels, and wherein the optimal pairing having the minimal difference the first type pixels and the second type pixels.

The apparatus above, wherein the processor configured to determine the optimal pairing based on the first type pixels and the second type pixels is to calculate the minimal difference using any one of the metrics, squared differences (SSDs); squared errors (SSEs); absolute transformed differences (SATDs); mean absolute differences (MADs); mean absolute errors (MAEs); mean squared differences (MSDs); or mean squared errors (MSEs).

An apparatus comprising: a receiver configured to receive an encoded bitstream comprising: a reference view comprising a reference block, a current view comprising a current block, and an indicator of a pairing; and a processor coupled to the receiver and configured to obtain first type pixels, wherein the first type pixels comprise neighboring pixels associated with the reference block; obtain second type pixels, wherein the second type pixels comprise neighboring pixels associated with the current block; perform illumination compensation(IC) computation using the positional paring associated with the first type pixels and the second type pixels.

The apparatus above, wherein the processor is further configured to: calculate a scaling factor a and an offset b based on the first type pixels and the second type pixels.

The apparatus above, wherein the pairing are based on index differences or pairing directions.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a receiver configured to receive video views comprising a reference view and a current view, the reference view comprises a reference block and the current view comprises a current block, and the reference view and the current view originate from either separate devices or separate video recorders of a same device independently of motion; and
    a processor configured to receive the reference block and the current block from the receiver and to receive computer instructions that, when executed, cause the apparatus to:
        obtain neighboring pixels of the reference block from another block in the reference view that neighbors the reference block,
        obtain pixel values of the neighboring pixels of the reference block, the pixel values of the neighboring pixels of the reference block represent illuminance,
        obtain neighboring pixels of the current block from another block in the current view that neighbors the current block,
        obtain pixel values of the neighboring pixels of the current block, the pixel values of the neighboring pixels of the current block represent illuminance,
        determine a first positional pairing between the neighboring pixels of the reference block and the neighboring pixels of the current block,
        determine a second positional pairing between the neighboring pixels of the reference block and the neighboring pixels of the current block after performing a left or right pixel shift of the neighboring pixels of the current block relative to the neighboring pixels of the reference block,
        perform decimation of the neighboring pixels of the reference block and the neighboring pixels of the current block, and
        determine an optimal pairing from between the first positional pairing and the second positional pairing based on the decimation, the pixel values of the neighboring pixels of the reference block, and the pixel values of the neighboring pixels of the current block.

2. The apparatus of claim 1, wherein the processor is further configured to:
    calculate a scaling factor a based on the optimal pairing;
    calculate an offset b based on the optimal pairing;
    obtain reference pixel values for reference pixels in the reference block; and
    encode a, b, an indicator of the optimal pairing, and the reference pixel values.

3. The apparatus of claim 2, further comprising a transmitter coupled to the processor and configured to transmit a, b, the indicator, and the reference pixel values.

4. The apparatus of claim 1, wherein the processor is further configured to:
    obtain reference pixel values for reference pixels in the reference block; and
    encode an indicator of the optimal pairing and the reference pixel values.

5. The apparatus of claim 1, wherein the processor is further configured to associate the reference block to the current block based on a disparity vector (DV).

6. The apparatus of claim 1, wherein the first positional pairing and the second positional pairing are based on index differences.

7. The apparatus of claim 1, wherein the first positional pairing and the second positional pairing are based on pairing directions.

8. The apparatus of claim 1, wherein the processor is further configured to determine the optimal pairing based on sums of absolute differences (SADs) between the pixel values of the neighboring pixels from the reference block and the pixel values of the neighboring pixels from the current block.

9. The apparatus of claim 1, wherein the processor is further configured to determine the optimal pairing based on sums of absolute errors (SAEs) between the pixel values of the neighboring pixels of the reference block and the pixel values of the neighboring pixels of the current block.

10. A method comprising:
    receiving a reference view and a current view, the reference view comprises a reference block and the current view comprises a current block, and the reference view and the current view originate from either separate devices or separate video recorders of a same device independently of motion;
    obtaining neighboring pixels of the reference block from another block in the reference view that neighbors the reference block;
    obtaining pixel values of the neighboring pixels of the reference block, the pixel values of the neighboring pixels of the reference block represent illuminance;
    obtaining neighboring pixels of the current block from another block in the current view that neighbors the current block;
    obtaining pixel values of the neighboring pixels of the current block, the pixel values of the neighboring pixels of the current block represent illuminance;
    determining a first positional pairing between the neighboring pixels of the reference block and the neighboring pixels of the current block;
    determining a second positional pairing between the neighboring pixels of the reference block and the neighboring pixels of the current block after performing a left or right pixel shift of the neighboring pixels of the current block relative to the neighboring pixels of the reference block;
    performing decimation of the neighboring pixels of the reference block and the neighboring pixels of the current block; and
    determining an optimal pairing from between the first positional pairing and the second positional pairing based on the decimation, the pixel values of the neighboring pixels of the reference block, and the pixel values of the neighboring pixels of the current block.

11. The method of claim 10, further comprising:
    calculating a scaling factor a based on the optimal pairing;
    calculating an offset b based on the optimal pairing;
    obtaining reference pixel values for reference pixels in the reference block;

encoding a, b, an indicator of the optimal pairing, and the reference pixel values; and transmitting a, b, the indicator, and the reference pixel values.

12. The method of claim 10, further comprising:

obtaining reference pixel values for reference pixels in the reference block;

encoding an indicator of the optimal pairing and the reference pixel values; and transmitting the indicator and the reference pixel values.

13. The method of claim 10, further comprising further determining the optimal pairing based on sums of squared differences (SSDs) between the pixel values of the neighboring pixels of the reference block and the pixel values of the neighboring pixels of the current block.

14. The method of claim 10, further comprising further determining the optimal pairing based on sums of squared errors (SSEs) between the pixel values of the neighboring pixels of the reference block and the pixel values of the neighboring pixels of the current block.

15. The method of claim 10, further comprising further determining the optimal pairing based on sums of absolute transformed differences (SATDs) between the pixel values of the neighboring pixels of the reference block and the pixel values of the neighboring pixels of the current block.

16. An apparatus comprising:

a receiver configured to receive an encoded bitstream comprising:

first reference pixel values of first reference pixels belonging to a first reference block of a reference view, the first reference pixel values represent illuminance;

neighboring reference pixel values of neighboring reference pixels and neighboring current pixel values of neighboring current pixels; and an indicator of an optimal pairing between neighboring reference pixels and neighboring current pixels, the neighboring reference pixels neighbor the first reference block, the neighboring current pixels neighbor a first current block of a current view, the reference view and the current view originate from either separate devices or separate video recorders of a same device independently of motion, the optimal pairing is based on decimation of the neighboring reference pixels and the neighboring current pixels, neighboring reference pixel values of the neighboring reference pixels, and neighboring current pixel values of the neighboring current pixels; and a processor coupled to the receiver and configured to calculate:

first current pixel values of first current pixels belonging to the first current block based on the first reference pixel values and the indicator; and a scaling factor a and an offset b based on the neighboring reference pixel values, the neighboring current pixel values, and the indicator, where calculation of a is based on the following formula:

$$a = \frac{N\Sigma_i x_i y_i - \Sigma_i x_i \Sigma_i y_i + \lambda}{N\Sigma_i x_i x_i - \Sigma_i x_i \Sigma_i x_i + \lambda}$$

where N is a number of the neighboring reference pixels and the neighboring current pixels per row, i is a counting variable such that i=0, 1, . . . , N−1, $x_i$ is the neighboring reference pixel value for an ith neighboring reference pixel, $y_i$ is the neighboring current pixel value for an ith neighboring current pixel, and λ is a regularization parameter equal to $$\Sigma_i \frac{x_i^2}{128}.$$

17. The apparatus of claim 16, wherein the processor is further configured to further calculate b based on the following formula:

$$b = \Sigma_i y_i - a * \Sigma_i x_i.$$

18. A method comprising:

obtaining a reference view and a current view, the reference view comprises a reference block and the current view comprises a current block, and the reference view and the current view originate from either separate devices or separate video recorders of a same device independently of motion;

obtaining first pixels comprising neighboring reference pixels associated with the reference block;

obtaining second pixels comprising neighboring current pixels associated with the current block;

determining a first positional pairing between the first pixels and the second pixels;

determining a second positional pairing between the first pixels and the second pixels after performing a left or right pixel shift of the second pixels relative to the first pixels;

performing decimation of the first pixels and the second pixels;

determining, based on the decimation, an optimal pairing between the first positional pairing and the second positional pairing in order to perform illumination compensation (IC) computation; and signaling an indicator of the optimal pairing.

19. The method of claim 18, further comprising calculating a scaling factor a and an offset b based on the first pixels and the second pixels.

20. The method of claim 18, wherein the optimal pairing represents a positional relation between the first pixels and the second pixels.

21. The method of claim 18, wherein the reference block is associated with the current block based on a disparity vector (DV).

22. The method of claim 18, further comprising determining the optimal pairing based on the first pixels and the second pixels, wherein the optimal pairing has a minimal difference between the first pixels and the second pixels.

23. The method of claim 22, wherein the minimal difference is based on one of:

a sum of squared differences (SSD);
a sum of squared errors (SSE);
a sum of absolute transformed differences (SATD);
a mean absolute difference (MAD);
a mean absolute error (MAE);
a mean squared difference (MSD); or
a mean squared error (MSE).

24. A method comprising:

obtaining a reference view and a current view, the reference view comprises a reference block and the current view comprises a current block, and the reference view and the current view originate from either separate devices or separate video recorders of a same device independently of motion;

obtaining first pixels comprising neighboring reference pixels associated with the reference block;

obtaining second pixels comprising neighboring current pixels associated with the current block;

obtaining an indicator for the current block, the indicator indicates a positional pairing between the first pixels and the second pixels, the positional pairing is based on decimation of the first pixels and the second pixels, first pixel values of the first pixels, second pixel values of the second pixels, and a left or right pixel shift of the second pixels relative to the first pixels, and the positional pairing; and using the positional paring for illumination compensation (IC) computation for the current block.

25. The method of claim 24, wherein the reference block is associated with the current block based on a disparity vector (DV).

26. The method of claim 24, wherein the positional pairing represents a positional relation between the first pixels and the second pixels.

27. The method of claim 24, further comprising calculating a scaling factor a and an offset b based on the first pixels and the second pixels.

28. The method of claim 24, further comprising skipping the IC computation when the reference block, the current block, or both the reference block and the current block are a pre-determined size.

29. The method of claim 28, wherein the pre-determined size is greater than 4 pixels long and less than or equal to 16 pixels long.

30. An apparatus comprising:
an extractor configured to obtain video views comprising a reference view and a current view, the reference view comprises a reference block and the current view comprises a current block, and the reference view and the current view originate from either separate devices or separate video recorders of a same device independently of motion; and
a processor coupled to the extractor and configured to:
obtain first pixels comprising neighboring pixels associated with the reference block;
obtain second pixels comprising neighboring pixels associated with the current block;
determine a first positional pairing between the first pixels and the second pixels;
determine a second positional pairing between the first pixels and the second pixels after performing a left or right pixel shift of the second pixels relative to the first pixels;
perform decimation of the first pixels and the second pixels; and
determine, based on the decimation, an optimal pairing between the first positional pairing and the second positional pairing, the optimal pairing is associated with the first pixels and the second pixels for illumination compensation (IC) computation.

31. The apparatus of claim 30, wherein the processor is further configured to calculate a scaling factor a and an offset b based on the first pixels and the second pixels.

32. The apparatus of claim 30, further comprising a signal processing module coupled to the processor and configured to signal an indicator of the optimal pairing.

33. The apparatus of claim 30, wherein the processor is further configured to associate the reference block to the current block based on a disparity vector (DV).

34. The apparatus of claim 30, wherein the processor is further configured to further determine the optimal pairing based on the first pixels and the second pixels, and wherein the optimal pairing has a minimal difference between the first pixels and the second pixels.

35. The apparatus of claim 34, wherein the minimal difference is based on one of:
a sum of squared differences (SSD);
a sum of squared errors (SSE);
a sum of absolute transformed differences (SATD);
a mean absolute difference (MAD)
a mean absolute error (MAE);
a mean squared difference (MSD); or
a mean squared error (MSE).

36. An apparatus comprising:
a receiver configured to receive an encoded bitstream comprising:
a reference view comprising a reference block,
a current view comprising a current block wherein the reference view and the current view originate from either separate devices or separate video recorders of a same device independently of motion, and
an indicator of a positional pairing between the reference block and the current block, the positional pairing based on a left or right pixel shift of pixels in the current block relative to pixels in the reference block and decimation of the pixels in the reference block and the current block; and
a processor coupled to the receiver and configured to:
obtain first pixels comprising neighboring reference pixels associated with the reference block,
obtain second pixels comprising neighboring current pixels associated with the current block, and
perform illumination compensation (IC) computation using the positional paring.

37. The apparatus of claim 36, wherein the processor is further configured to calculate a scaling factor a and an offset b based on the first pixels and the second pixels.

38. The apparatus of claim 36, wherein the positional pairing is based on index differences or pairing directions.

39. The apparatus of claim 1, wherein the decimation is by a factor of two.

* * * * *